March 25, 1924.
I. P. WARD
LEVEL
Filed March 13, 1922
1,488,419
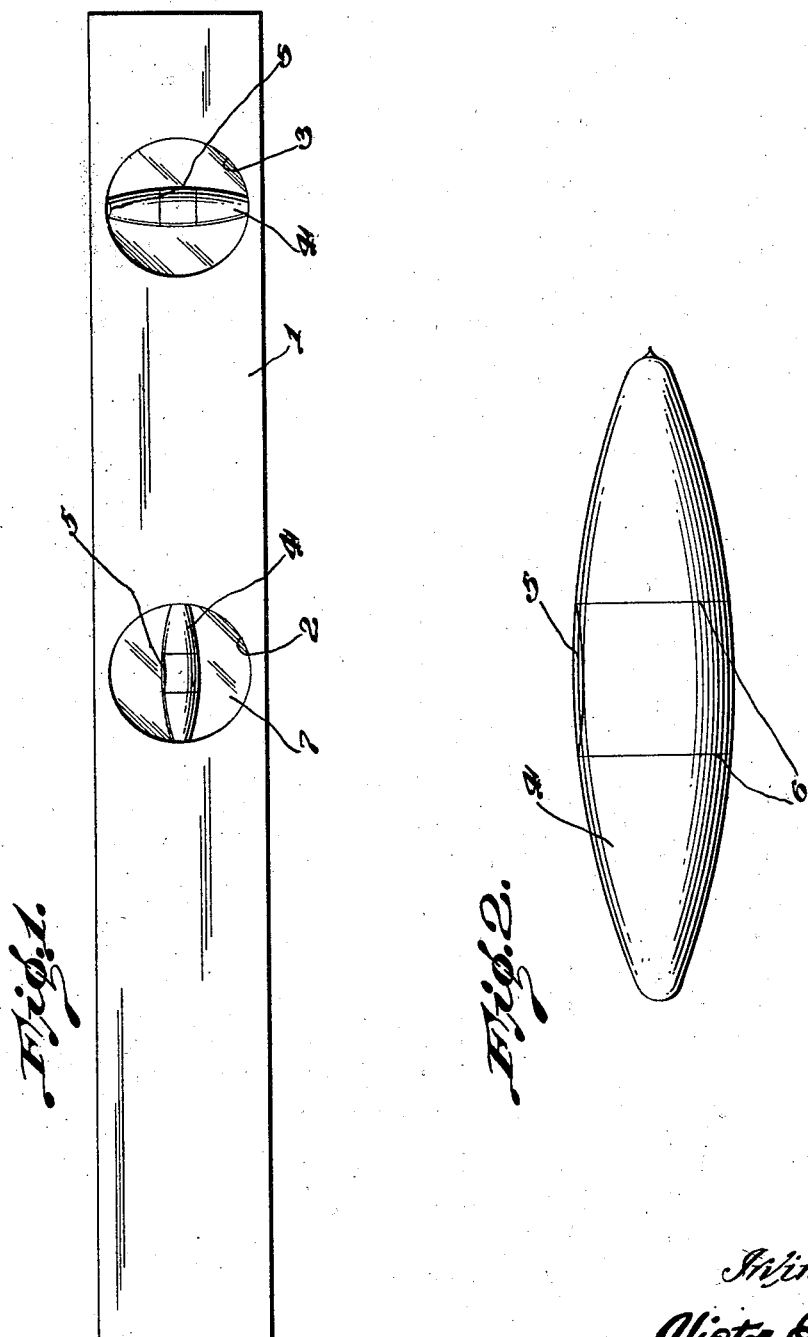

Patented Mar. 25, 1924.

1,488,419

UNITED STATES PATENT OFFICE.

IRVIN P. WARD, OF CHICAGO, ILLINOIS.

LEVEL.

Application filed March 13, 1922. Serial No. 543,300.

*To all whom it may concern:*

Be it known that I, IRVIN P. WARD, a citizen of the United States, residing at Chicago, in the county of Cook and State of Illinois, have invented new and useful Improvements in Levels, of which the following is a specification.

This invention relates to a level such as used by carpenters or analogous tradesmen, and an object of the invention is to provide a spirit level which can be used as a level or a plumb and which will accurately gauge the surface upon which the level is placed irrespective of which side, edge or corner of the level rule is placed in engagement with the surface to be gauged.

In the present approved types of spirit levels, it is necessary to place the edges of the level in flatwise engagement with the surfaces to be gauged, to permit accurate gauging of said surface and an accurate gauging cannot be obtained by placing the level rule with any of its corners or certain of its sides in engagement with the surface to be leveled or gauged, and neither can a plumb be obtained of points which are not perpendicular and it is therefore, an object of this invention to provide a spirit level and plumb structure which will overcome these features, and permit accurate gauging or plumbing of points not perpendicular or by use of any of the sides or corners of the level rule thereby providing a spirit level which embodies a wider range of manipulation than can be obtained of other approved types, and also one which will eliminate the use of a multiplicity of spirit containing vials in the ends of the plumb or level rule, such as resorted to in the present constructions of levels to permit plumbing of various points, one vial being provided in the level or plumb rule for plumbing purposes and one for leveling purposes, the said vials being constructed to permit accurate gauging from all points.

Other objects of the invention will appear in the following detailed description taken in connection with the accompanying drawing wherein:

Fig. 1 is a side elevation of the improved spirit level structure.

Fig. 2 is a side elevation of the spirit containing vial used in the spirit level and showing it removed from the body or rule of the level.

Referring more particularly to the drawings, the improved spirit level comprises the body or rule 1 which is constructed of wood, metal or any other suitable material, such as the bodies or rules of approved types of spirit levels now in use. The body or rule 1 is provided with a transverse opening 2 intermediate of its ends and a second transverse opening 3 adjacent to one of its ends, the said openings being provided to permit viewing of the vials 4 from either side of the body or rule 1. In the present construction of levels, the vials used are of equal diameter throughout their lengths which impairs the range of leveling or gauging action of the level, however, in the present invention the vials 4 gradually decrease in diameter from a point intermediate their ends, their central portions being a maximum diameter while they are of minimum diameter at their end portions, as clearly shown in Fig. 2 of the drawings, thereby providing a spirit containing vial which is substantially formed of the middle frustum of a prolate spheroid. The vials 4 are hermetically sealed to retain the spirits and air bubbles, which latter is indicated at 5 therein as is usual in the construction of spirit level vials and these vials are also marked with parallel markings extending thereabout as shown at 6 between which the bubbles 5 are confined when the proper plumb or level is obtained. The spirit containing vial 4 which is placed in the central opening 2 and is provided for the purpose of obtaining levels, is set in the body 1 in a position with its major axis parallel to the longitudinal lines of the level, while the vial 4 which is visible through the opening 3 and is provided for the purpose of plumbing is set with its major axis extending substantially at right angles to the axis of the vial 4 visible through the opening 2 and with its major axis parallel with the transverse lines or dimensions of the body or rule 1.

The vials 4 are secured in proper position in the body 1 by means of plaster Paris or any other suitable substance such as employed for this purpose and if it is desired glass panels 7 may be placed across the openings 2 and 3 on each side of the vials for protecting them. By the particular form of the vials the bubbles 5 may be made to properly register between the graduations 6 when the proper plumb or level is obtained irrespective of the portion of the body 1 which is in engagement with the surface to be gauged.

It is, of course, to be understood that the invention may be constructed in other manners and the parts associated in other relations and, therefore, I do not desire to be limited in any other manner except as set forth in the claims hereunto appended.

Having thus described my invention what I claim is:

1. As a new article of manufacture, a spirit containing vial for spirit levels formed substantially in the form of the middle frustum of a prolate spheroid.

2. A spirit containing vial for spirit levels having its maximum diameter equidistant of its ends and gradually decreasing in diameter from said point of maximum diameter throughout its length to its ends.

3. In a spirit level and plumb, a body provided with a pair of transversely extending openings, spirit containing vials mounted in said openings, said vials having their maximum diameters intermediate their ends and gradually decreasing in diameter towards their ends, said vials positioned with their maximum diameters at the axes of said openings, and one of said vials positioned parallel to the longitudinal lines of the body and the other at right angles to the longitudinal lines.

In testimony whereof I affix my signature.

IRVIN P. WARD.